June 1, 1965 H. H. ADELAAR 3,187,100

RESONANT TRANSFER TIME DIVISION MULTIPLEX SYSTEM UTILIZING NEGATIVE IMPEDANCE AMPLIFICATION MEANS

Filed April 24, 1961

Inventor

H. H. ADELAAR

By [signature]

Attorney

United States Patent Office 3,187,100

Patented June 1, 1965

3,187,100

RESONANT TRANSFER TIME DIVISION MULTIPLEX SYSTEM UTILIZING NEGATIVE IMPEDANCE AMPLIFICATION MEANS

Hans Helmut Adelaar, Antwerp, Belgium, assignor to International Standard Electric Corporation, New York, N.Y., a corporation of Delaware Filed Apr. 24, 1961, Ser. No. 104,967
Claims priority, application Netherlands, July 21, 1960, 254,030
10 Claims. (Cl. 179—15)

The invention relates to an amplifier system for time division multiplex resonant transfer circuits comprising first, second and third electrical energy reactive storage devices able to be selectively and repeatedly interconnected, the first with the third via a first gate during a first time slot corresponding to a first time channel on a multiplex highway, the second with the third via a second gate during a second time slot corresponding to a second time channel on a second multiplex highway or on said multiplex highway, amplifying means being provided to increase or restore the energy stored on said third device during repeated time intervals separating a pulse of said first time slot from the next pulse in said second time slot.

Such an amplifier system is disclosed in a 1959 Belgian Patent 579,759. The subject matter of this patent is also shown in a co-pending U.S. patent application entitled "Transient Repeater," S.N. 812,640, filed by Hans H. Adelaar on May 12, 1959, now Patent No. 3,117,185. Resonant transfer circuits are described in a 1956 Belgian Patent 543,262. The subject matter of this patent is also found in a co-pending U.S. patent application entitled "Electric Pulse Moden Circuit," S.N. 550,163, filed by K. W. Cattermole on November 30, 1955, now Patent No. 3,020,349, and in a 1959 Belgian Patent 558,179, which is also covered in a co-pending U.S. application entitled "Pulse Moden," S.N. 663,704, filed by K. W. Cattermole in June, 1957, now Patent No. 3,073,903.

Briefly, resonant transfer circuits using electrical energy reactive storage devices permit a substantially lossless transmission of energy between a source and a load, and this transfer may in fact be bidirectional. The principle of the operation of such resonant transfer circuits may best be described as follows. The signal energy is temporarily stored in reactive storage devices and by temporarily interconnecting two such storage devices during a well defined time interval corresponding to an interconnecting gate being rendered conductive, the signal energies stored at the time the two devices are interconnected, may swing from one reactive storage device to the other and vice versa, whereby at the time the connection between the two devices is interrupted, the energies accumulated in the two devices have now been interchanged. This transfer of energy may be performed substantially without losses, and moreover it is bidirectional. This exchange of energy samples can be illustrated by an interchange of charges when the storage devices are each constituted by shunt condensers of equal capacity C which are each associated with a series inductance of value L, the ends of the condensers not connected to these inductances being grounded. When the ends of the two inductances which are not directly connected to the condensers are momentarily interconnected through a gate, the arrangement effectively constitutes a series tuned circuit. Assuming that there are no resistive losses, and that the voltages across the condensers are respectively equal to $V_1$ and $V_2$ at the time of the interconnection, the instantaneous voltages across the two condensers will be respectively equal to the sum and to the difference of $$\frac{V_1+V_2}{2}$$

and $$\frac{V_1-V_2}{2}\cos wt$$

where $w$ is the natural resonance frequency defined by $w^2LC=1$. With the initial voltages respectively equal to $V_1$ and $V_2$, after exactly a half period of oscillation after which the connection is interrupted, these voltages will now be respectively equal to $V_2$ and $V_1$.

The resonant transfer principle has recently found favor for time division multiplex electronic switching systems principally in view of the limited losses whereas the sampling process of prior pulse systems involved substantial energy losses. Nevertheless, some small losses may yet be experienced in some time division multiplex switching systems using the resonant transfer principle, for instance due to the resistance inevitably associated with the inductances used in such resonant transfer circuits, due to the non-zero resistances of the electronic gates, etc.

Hence, the above system has the advantage of permitting amplification of the energy samples on the multiplex highways. Thus, it is not necessary to use an audio amplifier per voice frequency terminal of an electronic switching exchange. The amplifiers can be associated with the multiplex highways in such a manner that they are concentrated and the total number of amplifiers is reduced well below the number of subscribers connected to the exchange. Nevertheless, the amplifiers envisaged in FIGS. 9 and 10 of the above mentioned Belgian Patent No. 579,759 suffer from the chief disadvantage of being unidirectional. Thus, the number of time channels seized for a communication is necessarily doubled and one may not benefit from the bidirectional properties of the resonant transfer principle.

A general object of the invention is to realize an improved amplifier system for time division multiplex resonant transfer circuits which is bidirectional and yet does not suffer from severe limitations imposed by stability requirements.

In accordance with a first characteristic of the invention, in a system as defined at the beginning of the description, a third gate is provided interconnecting said third device with a negative resistance at least during part of the time intervals separating said first and second time slots.

It is to be noted that in the same Belgian Patent No. 579,759 already mentioned above, other embodiments envisaged already the use of a negative resistance amplifier but with the latter permanently associated to the multiplex highway and involving the use of at least two negative resistances if an actual overall amplification was to be secured without undesirable reflections. In this earlier system however, the negative resistances are effective at all times in a circuit including the multiplex highway, which is generally embodied by a coaxial cable, as well as the terminating source and load respectively connected to the multiplex highway through gates. In fact, there will usually be in a large exchange a plurality of highways connected in cascade. The source and load will also involve low pass filters leading to the calling and called subscriber's line circuits respectively. The highways unavoidably introduce additional circuit elements such as parasitic capacitances to ground. It is clear therefore that such circuits will in practice be prone to singing unless carefully designed. On the other hand, as envisaged by the present invention, the negative resistance is involved in a purely local circuit which does not include highways and the actual characteristics of which may be closely controlled, this circuit being isolated from the highways by electronic gates.

In accordance with another characteristic of the invention, an amplifier system as previously characterized is further characterized in that said negative resistance is grounded.

This is obviously an advantage in designing suitable negative resistance amplifiers which do not involve D.C. blocking circuits such as transformers which introduce bandwidth problems. In the Belgian Patent No. 579,759 previously mentioned, some embodiments do in fact use negative resistances which may be grounded, but these are all of the type which necessitates predetermined inductive couplings and though these need not be tight couplings such as necessitated by transformers, it will also be clear that the avoidance of mutual inductance circuits is a course for simplification of the circuit design.

The negative resistances of the invention may each be associated with their intermediate storage condenser through a corresponding gate, said condensers constituting said third reactive storage devices. But, in electronic switching systems of the type envisaged, the actual duration of the time slot provided for the repeated interconnections of the subscribers is chosen somewhat less than the time channel, i.e. the duration of the sampling period which is usually of the order of 100 microseconds, divided by the number of channels used on the highway. For instance, with 25 channels and a channel time of $$\frac{100}{25}=4 \text{ microseconds}$$

the actual interconnecting time for each channel may be taken as only 2 microseconds, leaving some 2 microseconds guard time between the effective interconnection times. This guard time will be beneficial with regard to diminishing cross talk between channels and it may be used to perform what are known as clamping operations which essentially consist in discharging common highway capacitances between the effective channel interconnection times. The system of the present invention offers the advantage that these guard time intervals between effective interconnection times may also be used to unblock the third gate establishing an operative circuit between the intermediate storage condenser and the negative resistance. Thus, the latter may well be provided in common for a number of intermediate storage condensers. With a suitable time constant, each guard interval may be sufficient to permit a suitable amplification of the signal sample temporarily stored on the intermediate storage condenser, whereby already during the effective time channel immediately following that during which a sample was established on the intermediate storage condenser, a sample with amplified energy can already be sent out from that condenser which may receive a new one in exchange to be amplified during the following guard time, etc.

Negative resistances used in this multiplex manner nevertheless suffer from possible crosstalk difficulties and as they are used at frequencies corresponding to the channel time duration, severe high frequency bandwidth requirements will usually be imposed.

According to yet another characteristic of the invention, an amplifier system for time division multiplex resonant transfer circuits includes a first and a second time division multiplex highways each respectively associated via gating means with a plurality of said first and second electrical energy reactive storage devices and via a plurality of said first and second gates to a plurality of said third devices each associated via said third gates to a corresponding negative resistance during repeated time intervals which cover several time channels used on said highways.

Thus, due to the negative resistances being, in accordance with the invention, used in conjunction with the intermediate storage principle, one may choose the two time channels used for passing an energy sample to and from the intermediate storage condenser, in such a way that an amplifying time is available which may be substantially larger than the channel time or the guard interval between adjacent effective interconnecting times. In this manner, one may considerably ease the frequency bandwidth requirements for the negative resistance amplifiers.

The above and other objects and characteristics of the invention and the best manner of attaining them as well as the invention itself will be best understood from the following description of detailed embodiments to be read in conjunction with the accompanying drawings wherein.

Figure 1:
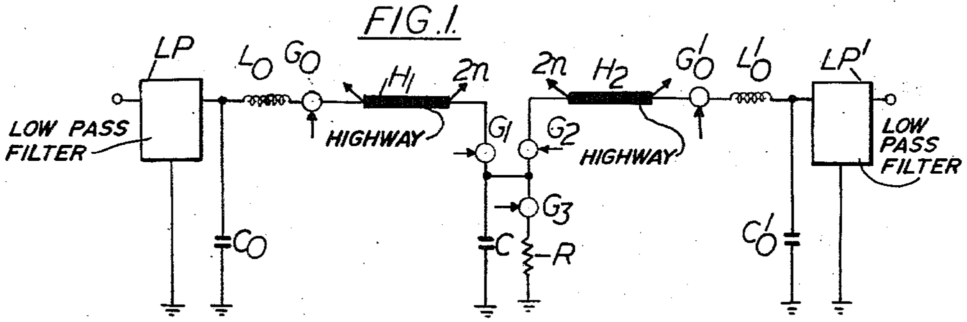
FIG. 1 represents a general embodiment of the negative resistance amplifier system of the invention using intermediate storage of energy samples.

Referring to FIG. 1, the latter shows a highway $H_1$ which is interconnected to a highway $H_2$ through a plurality of intermediate storage devices such as those represented.

Essentially, these intermediate storage devices each comprise a grounded condenser C. The free end of condenser C is connected to highway $H_1$ through a first gate $G_1$, to highway $H_2$ through a second gate $G_2$ and finally to the ungrounded end of the negative resistance —R through a third gate $G_3$. The other ends of the highways $H_1$ and $H_2$ are connected to a plurality of voice frequency circuits (not shown) each time through a gate such as $G_0$ in series with an inductance $L_0$ and a low pass filter LP including the shunt condenser $C_0$ facing the inductance $L_0$. The multiplying arrow next to the gate $G_0$ indicates that the highway $H_1$ is connected to a plurality of such frequency voice circuits mentioned immediately above. The multiplying arrow marked by $2n$ on the other side of the highway $H_1$ indicates that the latter is multiplied to a plurality of $2n$ intermediate storage circuits detailed above, $2n$ being the number of available time channels on the highway $H_1$; the connections are similar for the second highway $H_2$.

Normally, assuming the two highways $H_1$ and $H_2$ would be selectively interconnected at their inner ends, or permanently associated with one another, upon the simultaneous unblocking of the gates $G_0$ and $G'_0$, bidirectional exchange of signal energy could take place between the condensers $C_0$ and $C'_0$, and this on a resonant transfer basis due to the series inductances $L_0$ and $L'_0$.

With the intermediate storage scheme shown in FIG. 1, it is however possible to perform the transfer of energy in two steps, between which the signals may be amplified to any desirable extent, particularly as necessitated by the losses incurred in the normal transfer due for instance to the resistive losses of the gates such as $G_0$ and of the inductances such as $L_0$.

Figure 2:
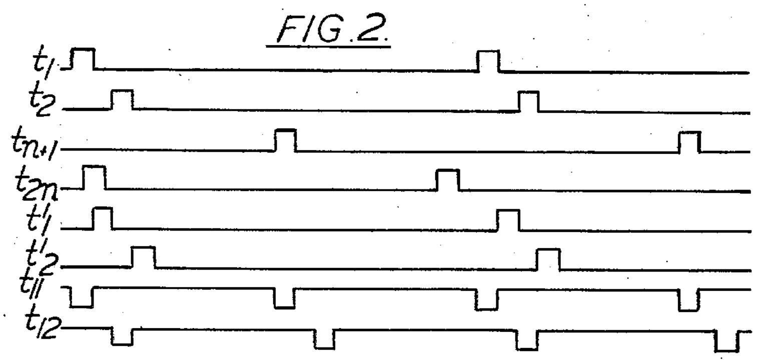
FIG. 2 represents pulse wave forms useful to explain the operation of the system of FIG. 1

In FIG. 2 are shown various pulse wave forms and the first four wave forms indicated correspond to some of the time channel interconnecting pulses $t_{1/2n}$. These are $2n$ in number although only four wave forms are shown, and it will be seen from the figure that the duration of the pulse is shown as only half the time channel which is evidently determined by the sampling period, corresponding to the repetition period of these pulses, divided by $2n$, the number of channels. Thus, there is a guard time, useful from the crosstalk viewpoint, between adjacent pulses such as $t_1$ and $t_2$ which guard time is taken equal to the actual interconnecting time.

During a first time channel, say $t_1$, the gates $G_0$ and $G_1$ will be simultaneously unblocked with the result that exchange of signal energy will take place between the condensers $C_0$ and C which may be of equal value while the inductance $L_0$ is given a suitable value to obtain an adequate resonant transfer. This inductance $L_0$ is shown as an individual element pertaining to each voice frequency circuit, but of course it may be an element used in common for several voice frequency circuits, since in principle it may be associated with the highway.

Actually, for symmetry reasons, the commoned ends of gates $G_1$ and $G_2$ might be connected to the junction of condenser C with gate $G_3$ through further inductances which might have the same value as the inductances $L_0$, $L'_0$. The effective series inductance for the resonant transfer would thus be twice the common value of all these inductances.

During the interval of time separating the end of the $t_1$ pulse from the beginning of the $t_2$ pulse, i.e. pulse $t'_1$, gate $G_3$ will now be unblocked, with the result that the condenser C will now be associated with the negative resistance —R. During this time interval separating the end of the positive pulse $t_1$ from the start of the positive pulse $t_2$, the potential across condenser C will therefore be exponentially increased and by a proper choice of the negative time constant CR a suitable amount of gain may be secured. Of course, this gain may merely compensate losses, even those incurred by intermediate storage on condenser C due to the latter being shunted by parasitic resistances leading normally to some decay of the stored voltage.

During pulse $t_2$, it is gate $G_2$ together with gate $G_0$ which will simultaneously be unblocked with the result that an exchange of signal energies will take place between condensers C and $C'_0$. An amplified signal sample has thus been transmitted from condenser $C_0$ to condenser $C'_0$ while an amplified signal sample from condenser $C'_0$ is now stored on condenser C. Provided gate $G_3$ is again unblocked by the pulse $t'_2$, during the guard time following $t_2$, exactly the same amplification will be secured for the sample from $C'_0$ as that obtained by the unblocking of $G_3$ during $t'_1$, for the sample coming from condenser $C_0$. At the end of $t'_2$, condenser C is left with an amplified sample from condenser $C'_0$ and during the next $t_1$ pulse, the gates $G_0$ and $G_1$ will again be unblocked permitting the amplified sample from condenser $C'_0$ to be issued from intermediate storage condenser C to condenser $C_0$.

It will be noted that if this amplifier system is applied to a communication network already using the principle of intermediate storage disclosed in the 1957 Belgian Patent No. 558,096 (E. P. G. Wright et al.) and if the original losses are for instance mainly due to this intermediate storage, the voltage across the condenser C decaying between the time intervals separating the two channel interconnecting times respectively used on the two highways $H_1$ and $H_2$, the gate $G_3$ may be repeatedly unblocked during each such time intervals as those corresponding to the positive pulses $t'_1$, $t'_2$ etc. Thus, there would in such a case be no need for a selective unblocking of the gate $G_3$ which would be periodically unblocked at $2n$ times the sampling frequency. In this manner, the amplification times would also be proportional to the decay times and a perfect compensation of such losses could be secured.

When the traffic on highway $H_2$ does not merely correspond to the traffic on highway $H_1$, or in other words when these two highways are not exclusively associated with one another but may work with other highways, some restrictions in the choice of the time channels on the two highways are bound to appear.

But if this is the case one may still use the negative resistance during only one guard time such as $t'_1$ immediately following the interconnecting channel time such as $t_1$. In this event, the negative resistance may even be used in multiplex manner since after it has performed its function during one guard time to amplify the signal on a particular storage condenser, it can again be used during the next guard time with regard to another intermediate storage condenser, etc. Thus, a negative resistance such as —R would be connected in multiple to a plurality of gates such as $G_3$.

However, if there is an exclusive association between the two highways $H_1$ and $H_2$, individual negative resistances per intermediate storage condenser may be retained with the advantage of being able to work at a substantially lower frequency than if they are used in multiplex fashion. For each communication over the two highways in cascade, one may choose a time channel $t_{(n+i)\mathrm{mod}\ 2n}$ on the highway $H_2$ when time channel $t_i$ is chosen on highway $H_1$. In this manner, the two time channels will be exactly in antiphase and there is maximum separation between these two time channels, which maximum separation may be exploited for coupling the negative resistance —R to its associated intermediate storage condenser C by unblocking gate $G_3$ during the corresponding time interval.

Thus, a pulse wave form such as $t_{11}$ in FIG. 2 may be used, the latter providing a positive pulse which extends from the end of the positive $t_1$ pulse to the start of the positive $t_{n+1}$ pulse, this pulse being repeated again from the end of the positive $t_{n+1}$ pulse up to the start of the next $t_1$ pulse, etc.

The repetition frequency of such a pulse wave form as $t_{11}$ is only twice the sampling frequency and nearly a half period is therefore available for unblocking the gate $G_3$ for securing amplification in both transmission directions.

Of course, if the system shown in FIG. 1 should be used for unidirectional transmission of signals, the full interval between the end of a positive $t_1$ pulse and the start of the next $t_{2n}$ positive pulse could be used for unblocking the gate $G_3$. Pulse $t_1$ would thus be used for unblocking gate $G_1$ while pulse $t_{2n}$ is used to unblock gate $G_2$. Then, the negative resistance —R might be in shunt across its associated intermediate storage condenser C during most of the sampling period.

In the bidirectional transmission case, the pulses $t_1$ and $t_{n+1}$ will be used for one communication, the pulses $t_2$ and $t_{n+2}$ (not shown) for another and so on, this for the unblocking of the gates $G_1$ and $G_2$ respectively, while gate $G_3$ will be unblocked by the pulses $t_{11}$, $t_{12}$ respectively etc.

The system of FIG. 1 may evidently be used if all the voice frequency circuits such as LP to be interconnected are associated with the same highway such as $H_1$. Then the gates such as $G_2$ in FIG. 1 would evidently be suppressed since there would be no highway $H_2$. Only the gates $G_1$ and $G_3$ would remain, but instead of there being $2n$ such gates with their associated intermediate storage condenser C and negative resistance —R, there would be only $n$ such intermediate storage circuits, and the gates such as $G_1$ would be unblocked twice in a sampling period, first to secure communication with the first voice frequency circuit LP via its line gate $G_0$, and second to secure a similar connection, after amplification of the signal sample on C, with another voice frequency circuit also connected to the highway $H_1$. Such an arrangement could be used either with a pre-assigned relationship between the two time channels used or without such a preassigned relationship, depending upon the circumstances already detailed above.

When the system of FIG. 1 using amplified intermediate storage between two highways, or for the same highway, is to be used in such a way that the relation between the time channels cannot be predetermined, it is possible to consider a special channel association selection circuit which will permit to secure connecting times for the negative resistances associated with the intermediate storage condensers which may be substantially larger than a time channel or substantially larger than the time interval separating two adjacent effective channel times.

In the Belgian Patent No. 515,605 (S. Van Mierlo—H. Adelaar) it has been explained how one may select the same time channels on two cascaded highways. In the U.S. application S.N. 55,647, filed on September 13, 1960, and entitled "System for Determining and Selecting Free Aligned Telecommunication Channels" (J. Masure), another channel alignment selection system has been explained by means of which in the case of alignment on two cascaded highways for instance, once the identity of these two highways to be involved in a communication is known, information about the free or busy state on the time channels on these highways can be secured from some channel availability store. This information pertaining to the busy or free state of all the channels on the two highways considered, can be extracted from that source and staticized during a suitable amount time interval on two sets of bistate circuits such as flip-flops, there being therefore altogether as many flip-flops as twice the number of channels on a highway. If the two flip-flops corresponding to the same channel indicate that the latter is free on both highways, by means of a coincidence gate, they produce an activating signal which is sent to a lock-out circuit having thus as many such inputs as there are time channels, and having also the same number of outputs. This lock-out circuit then takes care of producing an activating signal at only one of the various outputs irrespective of whether several activating signals are present at the various inputs. Thus, in this manner, according to a predetermined preference, a signal indicating an available aligned channel is selected out of several which might be available.

In the present case, due to the intermediate storage principle, alignment is no longer required, but in order to obtain a suitable minimum interval of time between the two time channels used, the association between the two time channels must nevertheless be selective.

Figure 3:
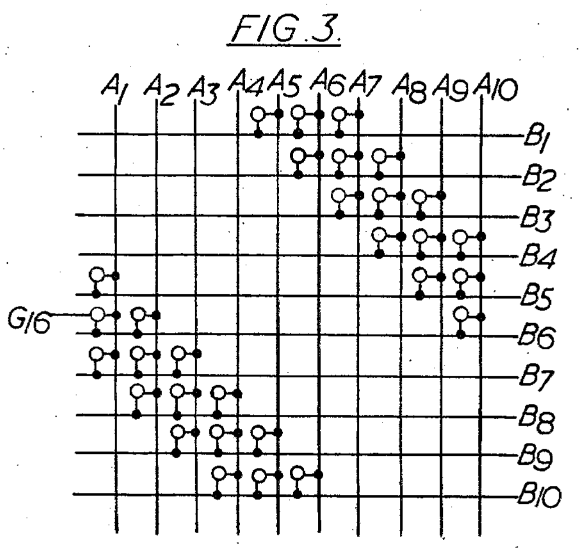
FIG. 3 represents schematically a time channel selection system which may be used in accordance with the invention.

FIG. 3 shows how this may readily be performed by way of an example which assumes that cascading on two highways is required, each of these catering for only ten time channels.

The inputs $A_{1/10}$ and $B_{1/10}$ correspond to the outputs of the two sets of flip-flops indicating that the corresponding channel on the corresponding highway is free, in the manner outlined above. Thus, when the vertical conductor is activated, this means that the first time channel $t_1$ is available on highway $H_1$, while when horizontal conductor $B_6$ is activated, this means that time channel $t_6$ is free on highway $H_2$. A plurality of gates such as $G_{16}$ have been shown to interconnect selected pairs of vertical and horizontal conductors such as $A_1$ and $B_6$. Each conductor of a set is only interconnected each time via a gate, with three conductors of the other set and these are chosen so that there is maximum time spacing between the pairs of channels which may thus be associated on the two highways. Hence, for instance, time channel $t_1$ can only be associated with time channel $t_5$, $t_6$ or $t_7$ on the other highway, as indicated by the three gates, such as $G_{16}$, which interconnect $A_1$ with $B_5$, $B_6$ or $B_7$ on the one hand, and $B_1$ with $A_5$, $A_6$, or $A_7$ on the other hand. Thus, altogether, there are 30 gates such as $G_{16}$, and various combinations of these gates may be simultaneously activated when an attempt is made to determine the selection of a suitable pair of time channels. The 30 outputs of these gates such as $G_{16}$ may then be fed to a lock-out circuit (not shown) of the type disclosed in the above mentioned Dutch patent application.

Whichever pair of time channels is selected however, it is clear from FIG. 3 that there would always be a minimum of three full time channels separating the two paired time channels. Thus, these intervals of time may be exploited in the manner indicated to secure a desirable amount of amplification by connecting the negative resistance to its associated intermediate storage condenser by unblocking the gate $G_3$.

It will be evident that whenever intermediate storage is used, the invention can be usefully applied. Thus, for instance, in the Belgian Patent No. 576,802 (H. Adelaar) where a two-wire/four-wire converter is disclosed as a substitute for the conventional hybrid arrangement and using an intermediate storage condenser, during suitable intervals of time separating the three time channels used in that converter system, amplification of the signal stored on that condenser could be secured by an associated negative resistance.

Also, in the Belgian Patent No. 579,759 (H. Adelaar), it has been pointed out that errors in timing of the unblocking of the gates will have a minimum influence on the amplification, if the voltage versus time characteristic of the signal across the intermediate storage condenser during the time the negative resistance is effective, offers a zero slope at the time the gate connecting the negative resistance in the circuit is blocked. As explained in that patent, a suitable resonant transfer circuit may achieve this, and with the present system, this could also be secured by associating an inductance with the condenser and the negative resistance circuit (*C—R*) when the gate $G_3$ is unblocked to interconnect these two elements. By a suitable choice of the inductance value with regard to the other parameters including the time of effective interconnection, this zero slope can readily be secured to stabalize gain if need be.

While the principles of the invention have been described above in connection with specific apparatus, it is to be clearly understood that this description is made only by way of example and not as a limitation on the scope of the invention.

I claim:

1. A resonant transfer circuit for a time division multiplex system comprising at least a pair of multiplex highways, first electrical energy storage means coupled to one end of a first of said highways, second electrical energy storage means coupled to one end of a second of said highways, third electrical energy storage means for coupling together the other ends of said pair of highways, means for providing a plurality of time slot signals, means responsive to a first time slot signal for resonantly transferring energy in digital form from said first storage means over said first highway to said third storage means, said energy being stored in said digital form in said third storage means, means responsive to another time slot signal for resonantly transferring said energy in said digital form from said third storage means over said second highway to said second storage means, and means effective during the interval between said first and other time slots and comprising a negative impedance device for increasing the energy stored in said digital form on said third storage means.

2. The circuit of claim 1 and gate means, said negative impedance device having at least two terminals, one of said terminals being connected to ground and the other of said terminals being connected to said third storage means via said gate means.

3. The circuit of claim 1 and a plurality of said first and second storage means, a plurality of first and second gate means individually associated with each of said first and second storage means respectively, and means for sequentially and individually coupling each of said storage means to said highways selectively responsive to said time slot signals.

4. The circuit of claim 3 and a plurality of said third storage means, a plurality of other gate means individually associated with each of said third storage means, and means for selectively connecting said negative impedance means to said third storage means via the other gate means individually associated with said third storage means.

5. The circuit of claim 4 wherein said negative impedance device comprises two output terminals, said other gate means being connected to one of said output terminals, and ground connected to the other of said output terminals.

6. The circuit of claim 4 wherein said other gate means is normally blocked, and means for unblocking said other gate means during each time slot separating said first and other time slots.

7. The circuit of claim 6 and means whereby other gate means is unblocked during guard time intervals separating said time slots.

8. The circuit of claim 7 wherein said means for providing said time slot signals operates at a system frequency, said means for unblocking said third gate operates at twice said system frequency, and means whereby the first time slot signals for controlling the transfer of energy over said first highway is 180° out of phase with respect to the other time slot signals for controlling the transfer of energy over said second highway.

9. The circuit of claim 3 and means for selecting one of said first gate means and one of said second gate means to complete a single voice channel from one of said first storage means over said first and second highways to one of said second storage means.

10. The circuit of claim 9 wherein said voice channel selecting means comprises an array of two input coincidence gates, means for activating one of said inputs when a time slot is available on said first highway, means for activating the other of said inputs when a time slot is available on said second highway, there being a number of said coincidence gates such that all of said coincidence gates are associated with pairs of time slots separated by minimum time intervals.

References Cited by the Examiner

UNITED STATES PATENTS

| | | | |
|---|---|---|---|
| 2,927,967 | 3/60 | Edson | 179—15 |
| 2,936,337 | 5/60 | Lewis | 179—15 |
| 2,936,338 | 5/60 | James et al. | 179—15 |
| 2,962,551 | 11/60 | Johannesen | 179—15 |
| 2,962,552 | 11/60 | Crowley | 179—15 |
| 3,061,681 | 10/62 | Richards | 179—15 |

FOREIGN PATENTS

| | | |
|---|---|---|
| 215,909 | 11/57 | Australia. |
| 221,992 | 6/58 | Australia. |

DAVID G. REDINBAUGH, *Primary Examiner.*

ROBERT H. ROSE, *Examiner.*